E. F. ABERNETHY.
CARBURETER FOR INTERNAL COMBUSTION ENGINES.
APPLICATION FILED MAR. 25, 1904.

1,137,727.

Patented May 4, 1915.
2 SHEETS—SHEET 2.

Witnesses
James F. Duhamel.
V. E. Nichols.

Inventor
Edwin F. Abernethy
By his Attorneys
Griffin Benchard Cavanagh

UNITED STATES PATENT OFFICE.

EDWIN F. ABERNETHY, OF BROOKLYN, NEW YORK, ASSIGNOR OF ONE-HALF TO GEORGE H. ABERNETHY, OF BROOKLYN, NEW YORK.

CARBURETER FOR INTERNAL-COMBUSTION ENGINES.

1,137,727.  Specification of Letters Patent. Patented May 4, 1915.

Application filed March 25, 1904. Serial No. 199,917.

*To all whom it may concern:*

Be it known that I, EDWIN F. ABERNETHY, a citizen of the United States, residing at Brooklyn, in the county of Kings and State of New York, have invented certain new and useful Improvements in Carbureters for Internal-Combustion Engines, of which the following is a full, clear, and exact description.

This invention relates to improvements in carbureters for use in connection with internal combustion engines.

Engines of this class are now used under a great variety of conditions and for different classes of work, but they may be divided generally into three classes, first, stationary engines, second, marine engines, and, third, engines for use on motor driven vehicles, such as automobiles. Engines of the first class are sometimes supplied with a mixture of gas and air, the gas being drawn from a supply main, or a hydrocarbon may be vaporized and mixed with air to produce a combustible mixture for use as a vehicle in propelling the engine.

In the practical service of marine engines designed for the propulsion of marine vessels, it is customary to install the engine near the stern or about amidships, while the hydrocarbon tank is located at a point remote from the engine, usually in the bow of the vessel, and elevated above the engine in order to afford a liquid head and to insure a supply to the carbureter. As long as the sea, or other body of water, is comparatively calm, the carbureter will be supplied with hydrocarbon under gravity feed; but when the water is rough and the vessel pitches in descending into the troughs of the waves, the level of the fuel supply falls below the carbureter and the engine, so that the fuel supply is not available on the stroke of the engine, hence the combustible mixture cannot be supplied to the engine at each stroke of the piston thereof. Somewhat analogous conditions are encountered in the service of internal combustion engines on motor-driven vehicles when hydrocarbon under gravity is to be supplied to the carbureter, because on the ascent of declivities or on sidewise tilting of the vehicle the fuel head is not available in supplying the carbureter with fuel for admixture with air to produce the combustible mixture. In the present invention, I seek to overcome these objections by the provision of a novel type of carbureter which is so constructed and arranged as to insure at all times and under all conditions a full and ample supply of fuel for admixture with the air to produce the combustible mixture. I also provide a construction which secures a proportionate admixture of air and fuel under changes in the speed or load of the engine, that is to say, under slow speed the same quality or grade of the combustible mixture is supplied to the engine as under high speed or heavy load conditions. I also provide means by which the volume of air supplied at each opening movement of the air valve may be regulated or controlled to change the quality or grade of the mixture as may be desired; such control of the air supply being secured without stopping the engine or throwing the carbureter even temporarily out of service.

The broad feature of the present invention consists in the provision of suction operated means in the carbureter for creating a partial vacuum therein, such vacuum being available in drawing into the carbureter a certain quantity of fuel which is proportionate to the supply of air. This mode of operation is important because in the absence of a fuel head under the conditions heretofore recited the fuel, either liquid or gaseous, will be sucked or drawn into the mixing chamber for admixture with the air.

Another part of my invention resides in a fuel valve controllable by the opening movement of a suction-operated air valve, said fuel-valve being peculiarly fashioned or constructed to regulate the admission of fuel proportionately to the volume of air admitted to the mixing chamber.

Another part of my invention resides in the employment of an adjustable air valve, arranged to be moved endwise by a suction draft through the mixing chamber. This valve consists of two parts each having air ports, one of said parts being capable of a rotative movement with respect to the other part and adapted to vary the effective area of the air ports through which the air is supplied to the mixing chamber.

The invention further consists in the novel construction of parts, and in the combination and arrangement of elements, as will be hereinafter fully described and defined by the claims hereto annexed.

Reference is to be had to the accompanying drawings, forming a part of this specification, in which similar characters of reference are used to indicate like parts in all the figures.

Figures 1, 2, 4:
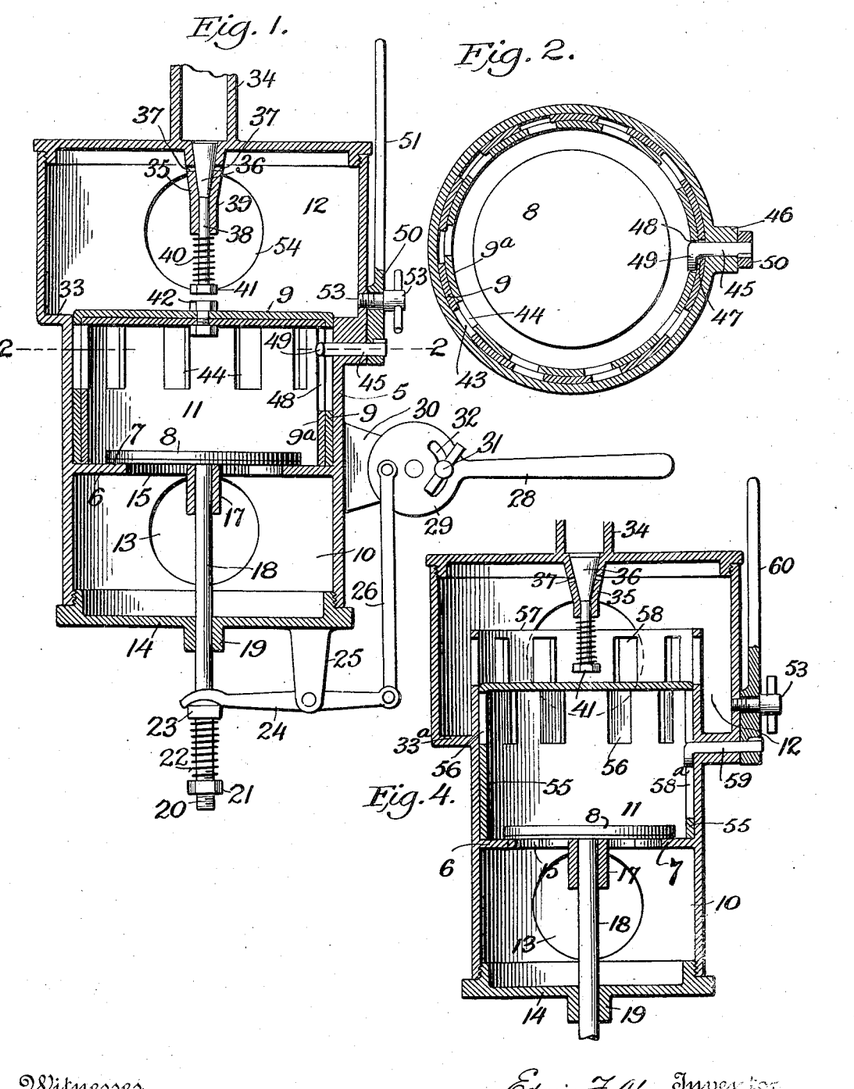
Figure 1 is a vertical central sectional elevation through a carbureter constructed in accordance with my invention.
Fig. 2 is a horizontal section taken in the plane of the dotted line 2—2 of Fig. 1.
Fig. 4 is a sectional elevation through a carbureter illustrating another type of the adjustable air valve.

5 designates the casing of my improved carbureter, the same being of any suitable form and dimensions. As shown by Fig. 1 of the drawings, the casing is provided with a partition, 6, and with a seat portion, 7, said partition, 6 and the portion 7 making provision for the accommodation of the two air valves, 8, 9. The casing is divided internally by the partition and the valves into three chambers, 10, 11, and 12, the first of which, 10, constitutes an air inlet chamber, the second, 11, a suction chamber in which a partial vacuum is created by the operation of the two air valves and by the suction draft from the engine, while the third chamber, 12, is a carbureting or mixing chamber to which the air and fuel are admitted in a way to be thoroughly commingled therein for producing the combustible mixture.

The casing is provided at a suitable point, as in one side thereof, with an opening, 13, which forms an air inlet to the chamber 10, and the lower end of the casing is closed by a suitable head, 14, which is shown as having a threaded connection with the casing and as closing the bottom portion of the chamber 10.

The partition 6 is formed with an air opening, 15, that is spanned by a spider having a guide tube, 17, in which is arranged to play the stem, 18, of the air valve, 8. The upper side or face of the partition, 6, is finished to afford a seat for the valve 8, and said valve may be of the usual or any preferred construction. This valve is placed under tension by any suitable form of retracting device, but I prefer to use a retractor which may be adjusted to vary the tension on the valve, the latter being always exposed to atmospheric pressure because air is free to enter the chamber 10 and to act against the lower side of the valve. As shown by the drawings, the stem 18, of the lower air valve 8 is extended through the air chamber, 10, and prolonged through a guide nipple, 19, that is made integral with the lower head, 14, of the casing. The protruding end of the valve stem is threaded for a part of its length, as at 20, and on it is screwed a nut, 21. A coiled spring, 22, is fitted loosely around the lower part of the valve stem, to find a seat on the nut, 21, and to normally depress the stem and the valve for the latter to occupy the seat on the partition 6. A shiftable collar, 23, is fitted loosely on the protruding part of the valve stem and it rests or presses on the upper part of the coiled spring, 22, and by forcing this shiftable collar downwardly more or less, the tension of the spring and its action on the valve, may be varied. As one means for adjusting the collar, I employ a lever, 24, which is fulcrumed at a point intermediate of its length on a hanger, 25, depending from the head, 14, of the casing, and this lever is forked or bifurcated at one end, said forked end of the lever fitting loosely on the valve stem and engaging with the shiftable collar. To the other end of the lever is pivoted the lower part of an upwardly extending link, 26, the upper end of which is pivoted to the head portion, of an adjusting lever, 28. This lever is pivoted by a bolt, which passes through the head portion of the lever and a bracket-lug, 30, which is fast with the casing, 5 on one side thereof. The lever is adapted to be held in an adjusted position by a suitable clamping device, such as the screw, 31, which is threaded in the bracket-lug and passes through a slot, 32, that is provided in the head portion, 27, of the lever concentric with the fulcrum, 29, thereof. It is evident that the clamping screw can be released and the lever shifted in one direction in order to move the lever 24 and cause its forked end to press the shiftable collar, 23, toward the nut, 21, thereby compressing the spring and increasing the tension on the valve, 8, after which the screw 31 may be tightened for the purpose of holding the valve under tension. The lever, 28, may, however, be moved in the opposite direction, and clamped in position, for the purpose of relaxing the pressure of the spring and decreasing the tension of the valve, 8, but under all circumstances this valve is held under more or less tension for the purpose of making it operate at a different period from or dissimultaneously with the other air valve, 9, whereby the suction draft from the engine is caused to exhaust the air from the chamber 11 in a way to create a partial vacuum therein.

The air valve, 9, is shown in the form of a hollow cylindrical shell, open at its lower part, and closed at the upper part by an imperforate head. This air valve is fitted snugly in the seat portion, 7, of the casing to normally occupy a lowered closed position wherein its head is substantially flush with a shoulder, 33, of the casing, whereby the valve, 9, cuts off communication between the vacuum chamber, 11, and the mixing chamber, 12, of the casing. This hollow air valve is of sufficient weight to drop by gravity to its closed position, and said valve operates independently of the lower air valve, 8, although both valves, 8, 9, are adapted to be opened by a suction draft through the carbureter. The hollow air valve, 9, is provided in its cylindrical shell, below the closed upper end thereof, with a plurality of ports which are adapted to be closed by the seat portion, 7, of the casing when the valve is lowered to its seated position, but when the valve, 9, is raised by the suction draft through the casing, the ports of said valve are exposed more or less above the shoulder, 33 for the purpose of establishing communication between the chambers, 11 and 12, and thus permit the air to be exhausted from the chamber, 11, more or less and to create a partial vacuum in said chamber before the spring-tensioned valve, 8, is opened by the continued application of the suction draft on the valve, 8.

Figures 3, 5:
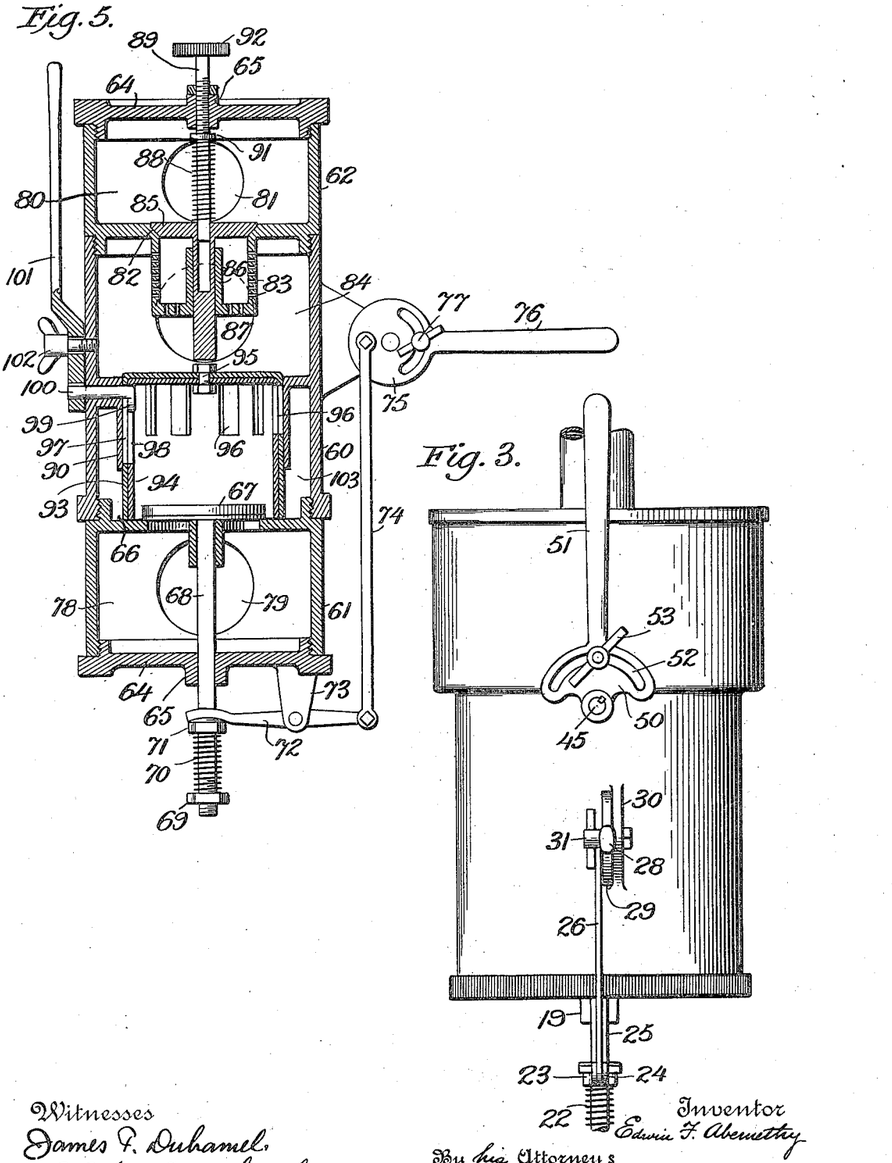
Fig. 3 is an elevation of the carbureter.
Fig. 5 is a vertical section through a form of carbureter adapted to be supplied with gaseous fuel.

In the embodiment of the invention shown by Figs. 1 to 3 inclusive of the drawings, I have shown one embodiment of means for supplying a liquid fuel, such as gasolene, to the mixing chamber 12 at a point above the air inlet to said carbureting or mixing chamber, and this fuel inlet is normally closed by a peculiar form of fuel valve which is controllable by the operation of the air valve, 9, and is adapted to regulate the volume of fuel supplied to the chamber, 12, in proportion to the quantity of air admitted to said chamber, for the purpose of securing a mixture of uniform grade or quality under all conditions of speed or load of the engine.

A fuel supply pipe, 34, is attached or coupled in a suitable way to the closed upper part of the casing which envelops the mixing chamber, 12, and with this pipe communicates a valve-tube, 35, the latter extending into the chamber 12. The upper part of this valve tube is conical in form while its lower part is cylindrical to furnish a guide for the stem of a valve, 36. The conical part of the valve-tube is provided with a plurality of ports, 37, which are shown as opening into the chamber, 12, and the conical or tapering fuel valve, 36, is ground into the valve tube for the purpose of making a tight fit or joint therewith, so as to effectually cut off the passage of liquid fuel when the valve is seated. Said valve is provided with a cylindrical stem, 38, which fits snugly in the guide portion, 39, of the valve-tube so as to furnish a means for guiding the fuel valve to movement in a rectangular path. The stem of the fuel valve is prolonged downwardly through and beyond the guide portion of the valve tube, and on this extended part of the stem is fitted a coiled spring, 40, the upper end of which is seated against the lower end of the valve-tube while the other end of the spring acts against a nut or collar, 41, fixed to the lower extremity of the valve-stem.

The lower end of the fuel-valve stem 38 terminates at a point just above the head of the air valve, 9, and thus the fuel valve has a coöperative relation to the air valve to be actuated or controlled thereby when the said air valve is opened, although the fuel valve is seated quickly by the action of its spring when the air valve is lowered by gravity to its seat. On the initial upward movement of the air valve, 9, it has a limited travel, for the head thereof to lift above the shoulder 33 and expose the ports in said valve before engaging with the stem of the fuel-valve; but on the continued ascent of the air valve, the fuel valve moves therewith, so that on the inrush of air into the mixing chamber, 12, the fuel is admitted through the ports, 37, into the valve tube, 35. The conical form of the fuel valve is advantageous in regulating the quantity of fuel admitted by the ports, 37, because the fuel valve has a movement or travel proportionately to the movement of the air valve, and this regulation of the fuel supply is also secured by the suction due to the maintenance of a partial vacuum in the chamber, 11, by the operation of the air valve, 9, and the spring tensioned valve, 8, as will hereinafter appear.

Although I have shown the carbureter of Figs. 1 and 2 as having a hollow valve open at its lower end and closed at its upper end, I do not desire to limit myself to this particular kind of valve in connection with a carbureter having means for establishing and maintaining a partial vacuum therein, which vacuum is available in inducing the inflow of fuel in proportion to the volume of air to secure a certain grade or quality of mixture at all speeds. It is evident that a suction-operated disk valve, such as 8, or a suction-operated valve of any other character may be used in lieu of the hollow valve in a carbureter of the suction type just described; but when the carbureter is adapted to be supplied with liquid fuel under gravity pressure, I may use the adjustable air valve shown by Figs. 1, 2 and 4 of the drawings, whereby the volume of air admitted at each opening movement of the valve may be regulated to change the quality or grade of the combustible mixture. In Figs. 1 and 2, this adjustable air valve is shown as consisting of companion members, 9, 9ᵃ, each open at the lower end and closed at the upper end, said members being concentric one with the other and fitted together for one member to have a rotative movement with respect to the other, although the two members are adapted to travel or play as one part. The members of the valve are pivoted by a pin or bolt, 42, and the respective members are provided with ports, 43, 44, of corresponding shape and area, said members being adjustable to vary the effective area of the air inlet afforded by said valve. The valve members may be adjusted for the ports thereof to register and produce an air inlet of maximum area, but one of the members may be adjusted relatively to the other to shift the ports therein more or less out of alinement with the ports of the other member, and thereby reduce the area of the air inlet of the air valve, whereby on the lift of the valve the quantity of air admitted to the mixing chamber is reduced.

The rotative adjustment of one valve member relative to the other may be effected without stopping the carbureter by the devices shown, the same consisting of a short shaft, 45, journaled in a suitable bearing, 46, of the casing. The valve member, 9, has a narrow guide slot, 47, while the other valve member, 9ª, has a comparatively wide slot, 48, in which is arranged to work a crank or eccentric, 49, on the inner end portion of the shaft, 45. To the outer end of this shaft is secured the enlarged end portion, 50, of an adjusting lever 51, said head portion of the lever having an arcuate slot 52, through which passes a binding screw, 53, that is threaded into the casing, 5, and is arranged to act against the lever for clamping it in an adjusted position. The lever and the shaft are normally held stationary, while the compound valve is free to have a vertically slidable movement with respect to the arbor, but if it is desired to vary the area of the air inlet through the slidable valve, it is only necessary to release the binding screw and shift the lever in a certain direction, thereby rocking the shaft 45 and making the crank or eccentric 49 act on the valve member 9ª to turn the same with respect to the companion member 9, thus bringing the ports in the two members more or less out of registration.

The casing 5 of the carbureter has a suction connection for the engine, said connection having communication with the mixing chamber 12.

In operation, assuming that the lever 28 is adjusted to relax the tension of the spring, 22, the vacuum maintaining valve 8 is practically free from restraint or tension, hence this valve 8 and the valve 9 will work practically simultaneously on a suction draft from the engine through the suction connection 54 and the chambers, 12, 11, the upward opening movement of the valve 9 operating to unseat the fuel valve. This operation of the valves, 8, 9, as just recited does not produce a partial vacuum in the chamber 11, and it is not intended that the valve 8 shall be left free to open simultaneously with the valve 9. On the contrary, however, the lever 28 should be adjusted to compress the spring 22 and make it place the valve 8 under tension, thus preventing the latter from opening simultaneously with the valve 9 and giving to the valve 8 an independent play or travel with respect to said valve 9, although both valves are intended for operation by the suction draft of the engine. With the valve 8 under tension, the valve 9 free to lift by the suction draft, the fuel free to flow through the pipe, 34, on the opening of the valve, 36, no matter whether the fuel is under head pressure or not, a suction draft from the engine through the chamber 12 lifts the valve 9 which in turn opens the fuel valve, 36, but as the opening movement of the spring-tensioned valve 8 is opposed by the spring or retractor, this valve (8) does not at once respond to the action of the suction draft, whereby the suction creates a partial vacuum in the chamber 11 and in the mixing chamber 12, which vacuum is available in drawing in a supply of fuel through the open fuel valve, 36, such supply of fuel being proportioned to the strength of the suction draft or the vacuum, and the fuel being drawn in by the suction irrespective of the existence of a head or gravity pressure of the fuel, as in cases where the gravity of the fuel head is not available owing to the changes in the position of the supply tank when the engine is used on a marine vessel or on a motor-driven vehicle. With the air and fuel valves, 9, 36, opened, and the maintenance of a partial vacuum in the chamber 11, a continued application of the suction draft from the engine opens the valve 8 to admit air from the chamber 10 into the chamber 11, and thus reduce the vacuum existing in the latter, whereupon the air rushes through the open valve 9 into the chamber 12 for admixture with the fuel and produces the combustible mixture.

By increasing the tension of the spring 22, the opening movement of the valve 8 may be resisted increasingly to maintain any desired state of vacuum, within certain limits, within the chamber 11, and this construction affords means by which the vacuum in the chamber 11 may be utilized to regulate the quantity of fuel that is induced to enter the mixing chamber owing to the existence of the vacuum, because the greater or stronger the vacuum maintained in said chamber 11 the more fuel that will be induced to enter the mixing chamber.

Immediately on the cessation of the suction from the engine, the valves 8, 36, are seated by their springs, and the valve 9 returns by gravity to its seat, hence the carbureter is closed against the admission of air to the chamber 11 and of air and fuel to the chamber 12.

I do not desire, however, to confine myself to the use of a regulating air valve wherein the two parts are adapted for simultaneous movement, because the same result (air regulation) is attainable by the construction shown by Fig. 4. In this form of construction, the air valve, 55, consists of a hollow shell, open at the bottom and closed at the top, said valve having air ports, 56. The other part, 57, of the valve is stationary, being made fast to or integral with the shoulder 33ª of the casing. This stationary valve member 57 rises a suitable distance from the casing shoulder into the mixing chamber 12, so as to extend well above the position assumed by the air valve when seated, and said valve member 57 is furnished with a plurality of air ports, 58, which occupy such positions relative to the ports 56 of the movable valve member as to register therewith when the valve 55 is raised by the suction draft. Said valve 55 has a vertical slot, 58ª, in which is arranged to play the crank on the rock shaft, 59, that is adapted to be manipulated by the lever 60, thus providing means for giving a rotative adjustment to the valve 55 and for bringing the ports 56 more or less into registration with the ports 58 of the member 57 when the valve 55 is lifted by the suction draft.

In Fig. 5 of the drawings I have shown a form of carbureter especially designed for use on a stationary class of internal combustion engines which are supplied with gaseous fuel from a city main. Under some conditions of supply from this source, it is found that at times the main is supplied with a head of gas under full gage pressure, while at other times the pressure drops to such a point that there is no appreciable gage pressure in the main, although there is a supply of gas available for utilization by a carbureter or mixer under one condition, namely, that the gas will be induced to flow into the carbureter as by establishing and maintaining a vacuum, as contemplated by this invention. In view of the variation, or the non-existence, of the gage pressure in the city main, a serious problem presents itself in the regulation of a carbureter for this class of work, in order to make it responsive to the various conditions of gas supply and to insure the production of a combustible vapor of a standard grade or quality suitable for use in an explosive engine. It is found, however, that a mixer or carbureter acting on the partial vacuum principle to induce the inflow of gas when no gage pressure is indicated, and to regulate the volume of air supplied by an adjustable air valve as contemplated by this invention, meets the practical requirements under the varying conditions. When the gas in the main is under gage pressure, the admission thereof by opening the fuel valve in harmony with the suction-lifted air valve allows such a volume of gas to pass into the mixing chamber in proportion to the air admitted by the air valve as to result in a combustible mixture which is too rich in carbon to be utilized to the best advantage in the engine; and under such conditions of gas supply, it is necessary to adjust the air valve in a way to increase the volume of air supplied to the mixing chamber in proportion to the gas until a mixture of the desired grade or quality is secured. As shown, the casing of the carbureter consists of three parts, 60, 61, 62, the same being separably coupled one to the other, and the end sections, 61, 62, being provided with removable heads, 64, each having a guide nipple, 65. The lower member, 61, of the casing is provided with a valve seat, 66, adapted to accommodate the vacuum-maintaining valve, 67, the stem, 68, of which passes through the guide nipple, 65, of the lower head. This valve stem is equipped at its lower end with a nut, 69, and with the coiled spring, 70, the upper end of which is engaged by the shiftable collar, 71, the latter being pressed into engagement with the coiled spring by the forked end of a lever 72. Said lever is fulcrumed on the hanger, 73, and to its otherwise free end is pivoted the link, 74, the other end of which is pivoted to the head, 75, of an adjusting lever, 76, the latter being clamped in position by the screw, 77, all substantially as heretofore described in connection with the vacuum-maintaining valve shown by Figs. 1 to 3 inclusive, whereby provision is made for placing the valve, 67, under variable tension. The lower member, 61, of the casing provides an air chamber, 78, which is furnished with a normally open air inlet 79, by which atmospheric air is free to enter the chamber and act against the under side of the valve, 67.

The upper member, 62, of the casing affords a gas-supply chamber, 80, which is provided with a suitable gas inlet, 81. In the bottom of this member 62 is provided a valve seat, 82, and from this bottom of said member depends a perforated cage, 83, the latter constituting a rose or spreader for supplying gas in thin streams to a mixing chamber, 84, on the opening of a gas valve, 85. The cage or rose 83 is shown as having perforations in its bottom and in the surrounding wall, and from the bottom of the cage rises a guide tube, 86, in which is arranged to play the stem, 87, of the gas valve, 85, said valve stem extending through the guide tube and projecting below the bottom of the cage or rose, as shown. The gas valve, 85, is shown as an ordinary disk with a beveled edge arranged to fit snugly to the seat, 82, in the bottom of the upper casing member, 62, and this valve is held normally to its seat by the pressure or tension of a spring, 88, which acts on the upper side of the valve. This spring envelops an adjusting spindle or pin, 89, which has threaded engagement with the nipple, 65 on the upper head, 64, of the casing; said spindle being provided with a collar 91, against which is seated the upper end of the gas-valve spring, 88. The lower end of the spindle is loosely received in a hollow or chambered upper portion of the gas-valve stem, 87, while the upper protruding end of the spindle is furnished with a knob or head, 92, thus exposing the spindle for convenient manipulation when it is desired to change the tension of the spring, 88.

Within a seat portion, 90, of the middle member 60 of the casing is fitted an adjustable air valve, consisting of two parts or members 93, 94, said air valve being constructed as shown by Fig. 1 or by Fig. 3, as preferred. For the sake of convenience, however, I have shown said adjustable air valve as consisting of two movable members, 93, 94, each open at the lower end and closed at the upper end; said members being pivoted together at 95 and each being provided with ports, 96. The member, 93, is provided in one side with a narrow groove, 97, and the member 94 is shown as having a wider groove, 98, the latter receiving the crank, 99, on the inner end of a short shaft, 100, which is journaled in the member 60 of the casing. To the outer end of this shaft is secured the adjusting lever, 101, that may be held in adjusted positions by a suitable clamping screw, 102, all substantially as hereinbefore described. The described construction provides means for imparting a rotative adjustment to the members of the air valve in a way to vary the area of the air inlet, and this adjustment may be performed easily and quickly, and without arresting the operation of the air valve and the carbureter.

The head of the slidable air valve, and the stem 87 of the gas valve, are arranged close to one another so as to have a coöperative relation, and on the upward movement of the air-valve, its head engages with the foot of the gas-valve stem, so that the gas valve, 85, will be unseated or lifted on the ascent of the air valve, whereby the two valves operate in unison.

Under normal conditions all the valves are seated, the adjustable air valve serving to divide the middle member 60 of the casing into a partial vacuum chamber, 103, and the mixing chamber 84, hereinbefore mentioned. When the gas is supplied under gage pressure in the main to the chamber, 80, of the carbureter, there should be a very light tension exerted by the spring, 70, on the valve, 67, thus permitting this valve to open freely with the adjustable air valve by a suction draft through the carbureter from the engine. This operation does not provide for the maintenance of a vacuum in the chamber, nor is it necessary to do so, because the gas is supplied under pressure; but this fact makes it necessary to regulate the volume of air admitted by the valve, 93, 94. It is evident that the valve may be adjusted by shifting the position of the lever, 101, which in turn imparts a rotative movement to one valve member for changing the relation of the ports thereof to the complemental valve member, as will be understood. This adjustment of the air valve secures a supply of a volume of air at each movement of the air valve for admixture with the gas admitted by the valve, 85, to secure a proper proportion of air and gas necessary to produce a combustible mixture of the required grade or quality, and this is advantageous because the volume of gas supplied by the valve 85 may vary with the gage pressure, hence the carbureter is controllable to secure a standard grade or quality of mixture under varying gas pressures. It is found, however, that the gas supply in the main may drop to a point where there is no gage pressure, hence the gas will not flow into the chamber 84 when the valve 85 is opened, but to overcome this objection, the lever 76 may be moved to make the spring, 70, exert tension on the valve, 67, whereby the opening movement of the valve 67 is opposed whereas the air valve is free to open by the suction draft. Now, a suction draft from the engine lifts the air valve which in turn unseats the fuel valve, 85, thereby establishing and maintaining a partial vacuum in the chamber, 103, which is available in inducing the inflow of a quantity of gas proportional to the air for admixture therewith to secure the combustible mixture. Of course, the suction draft will open the valve, 67, after the establishment of the vacuum in the chamber, 103, and the drawing in of the supply of gas to the chamber 84, so that the air in necessary volume is admitted to the mixer. The volume of the air admitted by the valve, 67, and the quantity of gas drawn in by the establishment of vacuum in the chamber 103, may be controlled by placing more or less tension on the valve, 67, as will be understood.

My improved mixer or carbureter constructed as shown by Fig. 5, or in an equivalent manner, for taking gas from a city main is automatic in regulating the admission of the requisite volume of gas and air to secure a standard grade or quality of combustible mixture when the gas pressure fluctuates within certain limits, although when the gage pressure is at a comparatively high point it may be necessary to regulate the adjustable air valve to increase the volume of air in proportion to the gas which enters in greater volume owing to the pressure, and on the diminution of supply below gage pressure it is necessary to interpose the tension of the spring on the valve 67, so as to establish and maintain a partial vacuum in the chamber 103 for inducing the inflow of gas.

As just stated, an advantageous feature of my mixer is its capacity for self regulation when used to secure a supply of gas from a main, or its equivalent, the pressure in which may vary within limits not falling below gage pressure. Under such conditions, practically no tension is exerted on the valve, 67, and the two-part air valve 93, 94, or its equivalent, is exposed to atmospheric pressure, while the gas valve, 85, is subjected to pressure from the source of gas supply, whereby the air valve and the gas valve are balanced one against the other. A slight upward travel of the balanced air valve due to the suction draft from the engine is resisted by the pressure of gas on the gas valve and by the tension of the spring, 88, so that on the prevalence of high gas pressure in the source of supply, the gas valve 85 is not opened fully or widely by the movement of the air valve, and the required volumes of air and gas are admitted to produce the combustible mixture, the gas and the air rushing at a higher velocity through the respective inlets. A decrease within a certain limit in the pressure of gas in the source of supply offers less resistance to the movement of the gas and air valves, hence the gas valve will open wider when lifted by the air valve and the required volume of gas, under the decreased pressure, is admitted to the chamber 84 in proportion to the volume of air admitted by the air valve under the increased travel imparted thereto by the suction draft.

Special stress is laid on the provision of suction operated means in a mixer or carbureter for establishing and maintaining therein a partial vacuum for inducing the inflow of fuel for admixture with air, because herein lies the broad feature of my invention.

Importance is also attached to the provision of means by which the strength or degree of partial vacuum is controllable at will in the mixer or carbureter, said end being attained by interposing more or less resistance to the opening movement of the vacuum-maintaining valve. This is an advantageous feature of my device because on it rests the control of the volume of fuel which is admitted at each opening movement of the air and fuel valves, whereby provision is made for regulating automatically the supply of fuel in volumes proportionate to the quantity of air to automatically produce a combustible mixture uniform in grade or quality under varying speeds or loads of the engine.

These broad features of the invention may be secured in a mixer or carbureter by the employment of different combinations of devices, examples of which have already been given, and it is to be understood, therefore, that I do not strictly confine myself to the specific construction and arrangement of devices shown by the drawings. Nor do I in every instance desire to limit myself to the use of valves of the specific class herein disclosed, because valves of other types, such as swinging or rocking valves, may be used in lieu of sliding valves to carry out the principles of the invention. Furthermore, changes in the form, minor details of construction, size and proportion of parts may be made without departing from the spirit or sacrificing the advantages of my invention. I therefore reserve the right to make such alterations as fairly fall within the spirit of the invention as defined by the annexed claims.

What I claim as new, and desire to secure by Letters Patent is:—

1. A carbureter having a chamber, an air valve, a fuel valve controllable by said air valve, and means under tension and operating independently of the aforesaid valves for maintaining in said chamber a partial vacuum equal to that established by a suction draft through said chamber, whereby such vacuum draws fuel from a fuel inlet valve into said chamber.

2. A carbureter having a chamber, a fuel inlet thereto, and a plurality of independent suction-operated devices, the one of said devices which primarily admits air to said chamber being under tension, the aforesaid devices operating to maintain in the chamber a partial vacuum equal to that established by a suction draft through said chamber, whereby such vacuum draws fuel from the fuel inlet into said chamber.

3. A carbureter having a chamber, a fuel inlet to said chamber, air and fuel valves, and suction-operated means under tension and independent of the aforesaid valves for maintaining in the chamber a partial vacuum equal to that established by a suction draft through said chamber, whereby such vacuum draws fuel from the inlet into said chamber.

4. A carbureter having a valved chamber, a fuel inlet to said chamber, a plurality of air valves adapted to be unseated successively by a suction draft through the chamber, a tension device coöperating with the valve by which air is admitted initially to said chamber, and a fuel valve controllable by one of said air valves, the construction and arrangement being such that a partial vacuum is maintained in the chamber equal to that established by a suction draft through said chamber, whereby such vacuum draws fuel through the fuel inlet into the chamber.

5. A carbureter having a carbureting chamber, an air valve, a fuel valve for admitting fuel to said chamber, and a vacuum-maintaining valve operating independently of the air valve and subsequent to the opening movement of the latter, whereby a partial vacuum is maintained in the carbureting chamber equal to that established by a suction draft therethrough.

6. A carbureter having carbureting and vacuum chambers, air and fuel valves operatively related to the carbureting chamber, an independent vacuum-maintaining valve for the vacuum chamber, and a tension device for said last-mentioned valve, whereby the valves operate to maintain in the vacuum chamber a partial vacuum substantially equal to that established by a suction draft through said chamber.

7. A carbureter having a chamber, an air valve, a fuel valve to supply fuel to said chamber, a vacuum-maintaining valve independent of the air valve, and arranged to be operated by a suction draft for maintaining a partial vacuum in said chamber equal to that established by a suction draft therethrough, and a tension device for the vacuum-maintaining valve.

8. A carbureter having air and fuel valves, a vacuum-maintaining valve independent of the aforesaid valves, and means opposing the opening movement of the last-mentioned valve and insuring thereto operation subsequent to the air valve.

9. A carbureter having a chamber, a fuel-supply therefor, two air valves arranged for independent operation under a suction draft, and a variable tension device for one of said valves.

10. A carbureter having a chamber, a fuel supply therefor, two air valves arranged for independent operation under a suction draft, a tension device for one of said valves, and means for effecting a variation in the resistance of the tension device.

11. A carbureter having a chamber, a fuel supply therefor, two air valves arranged for independent operation by a suction draft, a tension device for one of said valves, a lever, and means actuated by the lever for varying the resistance of the tension device.

12. A carbureter having carbureting and vacuum chambers, a fuel supply for the carbureting chamber, two valves coöperating with the vacuum chamber, and one of said valves being free to open by a suction draft, and a tension device opposing the movement of the other valve.

13. A carbureter having carbureting and vacuum chambers, a fuel valve for the carbureting chamber, an air valve between the two chambers and arranged to control the fuel valve, another air valve for the vacuum chamber, and a tension device for the last mentioned valve.

14. In a mixer, a casing having a mixing chamber, a mixture valve, a rose arranged to be supplied with gas when said valve is opened, an air valve, and means operating independently of said valves for maintaining in said chamber a partial vacuum substantially equal to that established by a suction draft through said chamber.

15. A carbureter having carbureting and vacuum chambers, a variable air valve controlling the communication between the chambers, suction operated means for establishing and maintaining a partial vacuum in the vacuum chamber, and a fuel valve for the carbureting chamber.

16. A carbureter having carbureting and vacuum chambers, a fuel valve for the carbureting chamber, an air valve between the two chambers, means for varying at will the area of the air inlet afforded by said valve, and suction operated means for establishing a partial vacuum in the vacuum chamber.

17. A carbureter having carbureting and vacuum chambers, a valved fuel inlet to the carbureting chamber, a valve between the chambers, a valve at the inlet to the vacuum chamber, and means controllable at will for interposing a variable resistance to the opening movement of the last mentioned valve.

18. A carbureter having a fuel valve subject to the pressure of fuel in an available source of supply, an air valve arranged to actuate the fuel valve and adapted to be itself operated by a suction draft, and means operating independently of the aforesaid valves for maintaining a partial vacuum equal to that established by a suction draft through a chamber, such vacuum being available in drawing fuel from said source of supply through the fuel valve.

19. A carbureter having a fuel valve, an air valve, suction-operated means acting independently of the aforesaid valves and maintaining a partial vacuum equal to that established by a suction draft through a chamber, and means controllable at will for varying the extent or strength of said partial vacuum.

20. In a carbureter, a chamber, means connecting with said chamber whereby a suction draft from an engine establishes a partial vacuum in said chamber, means for supplying a combustible to said chamber, and a plurality of air admission valves positioned in alinement with each other and adapted to control the flow of air into and through said chamber, said plurality of air admission valves being positioned for operation successively and at each period a suction draft is established within said chamber.

21. A carbureter comprising a casing having a plurality of chambers, means whereby one of said chambers is adapted to be placed in substantially direct communication with an engine, a suction operated valve intermediate said chambers, a tension-controlled valve controlling the admission of air to the other of said chambers, and means for supplying fuel to that chamber which is adapted to be placed in substantially direct communication with the engine.

In testimony that I claim the foregoing as of my invention, I have hereunto signed my name in the presence of two subscribing witnesses.

EDWIN F. ABERNETHY.

Witnesses:—
 ALONZO C. FARNHAM,
 GIFFORD LE VELSAM.